(12) United States Patent
Lindqvist et al.

(10) Patent No.: US 7,844,436 B2
(45) Date of Patent: Nov. 30, 2010

(54) METHOD AND LOCALIZATION UNIT FOR DETECTING AND LOCATING LOAD COILS IN A TRANSMISSION LINE

(75) Inventors: Fredrik Lindqvist, Älvsjö (SE); Antoni Fertner, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 12/478,908

(22) Filed: Jun. 5, 2009

(65) Prior Publication Data

US 2010/0156553 A1    Jun. 24, 2010

Related U.S. Application Data

(60) Provisional application No. 61/138,694, filed on Dec. 12, 2008.

(51) Int. Cl.
*G06F 17/50* (2006.01)
*G01R 15/00* (2006.01)

(52) U.S. Cl. .......................................... 703/13; 702/57
(58) Field of Classification Search ............... 703/13; 702/57, 65
See application file for complete search history.

(56) References Cited

U.S. PATENT DOCUMENTS

| 4,620,068 | A | 10/1986 | Wieder |
| 5,404,388 | A | 4/1995 | Eu |
| 6,668,041 | B2 * | 12/2003 | Kamali et al. ............ 379/1.04 |
| 6,724,859 | B1 * | 4/2004 | Galli .......................... 379/1.04 |
| 2004/0061577 | A1 * | 4/2004 | Breisch et al. .............. 333/247 |
| 2007/0014393 | A1 * | 1/2007 | Jensen et al. ................ 379/30 |
| 2007/0140474 | A1 * | 6/2007 | Fertner et al. ............... 379/398 |
| 2007/0230667 | A1 * | 10/2007 | Warner et al. ............ 379/27.01 |

FOREIGN PATENT DOCUMENTS

WO    WO 2007/072191    6/2007

OTHER PUBLICATIONS

Sunrise Telecom, "SunSet xDSL: Load Coil Testing" Publication No. APP-XDSL-O12Rev, B, 2001.*
Bisignani, William T.: "Automated Loaded Transmission-Line Testing Using Pattern Recognition Techniques", IEEE Transaction on Instrumentation and Measurement, IM-24, No. 1, 1975, March 1975.

* cited by examiner

*Primary Examiner*—Paul L Rodriguez
*Assistant Examiner*—Eunhee Kim

(57) ABSTRACT

A method and localization unit for localizing load coils within a transmission line. The load coil localization is achieved using a measurement of a Single-Ended Line Testing (SELT) parameter for the transmission line and an approximation of the SELT parameter obtained from a model of the transmission line. The model is based on a parameter vector $\theta$ including parameters describing the transmission properties of each load coil and cable section and the length of a plurality of individual cable sections as unknown independent parameters. The location of at least one load coil is determined by substantially minimizing a criterion function that represents a deviation between the measurement of the SELT parameter and the approximation of the SELT parameter obtained from the model. The load coil localization method and unit can be used for both symmetric and asymmetric transmission lines.

26 Claims, 4 Drawing Sheets

METHOD AND LOCALIZATION UNIT FOR DETECTING AND LOCATING LOAD COILS IN A TRANSMISSION LINE

CROSS-REFERENCE TO RELATED APPLICATIONS

This application claims the benefit of U.S. Provisional Application No. 61/138,694 filed Dec. 12, 2008 and entitled, "Method for Detecting and Locating Load Coils," the contents of which are incorporated by reference herein.

STATEMENT REGARDING FEDERALLY SPONSORED RESEARCH OR DEVELOPMENT:

Not Applicable

REFERENCE TO SEQUENCE LISTING, A TABLE, OR A COMPUTER PROGRAM LISTING COMPACT DISC APPENDIX:

Not Applicable

BACKGROUND OF THE INVENTION

The present invention relates in general to the field of transmission line analysis and more particularly to a method and localization unit for locating one or more load coils within a transmission line.

Many copper-access network operators still have a considerable amount of customers subscribing only for telephony, i.e., plain old telephone service (POTS). Consequently, there is a great interest in estimating the suitability of twisted-pair copper lines for broadband services, provided by state-of-the-art digital subscriber line (DSL) technologies such as ADSL2+ and VDSL2. Common impairments that hinder or reduce the full potential of broadband access over these lines are, for example, crosstalk ingress due to line impedance imbalance, bridged-taps, and load coils. By far, the most severe impairment of these is the load coils, which are found on numerous lines in some countries.

A load coil is an inductive device that works like an impedance-matching transformer. Telecom operators used to install load coils in order to provide telephony to customers located far from the Central Office (CO). However, while the load coil reduces line attenuation at voice frequencies, it also drastically increases the attenuation at higher frequencies utilized by broadband services. Thus, the load coils must be removed before the line can be deployed for broadband services using the higher frequencies.

The operator has few options to pre-qualify the lines before investing in, and installing, broadband equipment. Essentially the options involve sending a technician into the field to conduct (expensive) manual testing, or to estimate the transmission line capacity from, for example, a database. Estimation is often not possible because in many cases the original lines were installed decades ago, and various kinds of modifications have been made throughout the years. Thus, databases of the access lines are often non-existent or inaccurate. Hence, a more attractive option for the operator is to employ automated one-port measurements from the CO, referred to as single-ended line testing (SELT).

The existing POTS transceivers have been designed to monitor and diagnose the narrow voice-band (0-4 kHz) by measuring elementary parameters such as DC/AC voltage and the resistance/capacitance at frequency zero between the wires of the line and between each wire and ground. These types of traditional measurements normally require metallic access to the line, which is commonly provided by expensive bypass-relays. Still, a large number of POTS transceivers are unable to detect and locate load coils. Moreover, conventional DSL modems, with a built-in SELT function, are not designed to detect the load coils since the access to the lower voice frequencies is normally blocked by the splitter filter, required by the co-existence of POTS and DSL transmission. Pre-qualification with DSL modems typically fails to distinguish the load coil from a cable-break or the far-end line termination. Consequently, there is a substantial benefit in performing these measurements via the already installed (narrow band) transceivers carrying POTS, i.e. via the telephone line cards.

There are several prior art methods oriented towards the detection of load coils. U.S. Pat. No. 4,620,068, U.S. Pat. No. 5,404,388, and U.S. Pat. No. 6,668,041 all describe methods that determine whether a line is equipped with load coil(s), i.e., whether a line is loaded or not, by detecting characteristics in the magnitude or the phase of the measured line. However, localization of the load coil(s) is not addressed.

In a co-assigned PCT Patent Application WO 2007/072191 filed on Dec. 20, 2006 and entitled, "Load Coil Detection and Localization", both load coil detection and localization are considered. The contents of this application are incorporated by reference herein. However, in cases where the transmission line is not symmetric, the methods and devices disclosed in this application may fail to provide a sufficiently accurate load coil localization.

In the article entitled, "Automated Loaded Transmission-Line Testing Using Pattern Recognition Techniques" by William T. Bisignani, published in *IEEE Transaction On Instrumentation and Measurement*, IM-24, No. 1, 1975, automated testing of loaded lines is proposed. The method addresses load coil detection and localization by comparing the line under test with a pre-defined set of classes that represent possible line configurations. A decision space consisting of 20 regions (clusters) are utilized, each corresponding to one class. The number of pre-defined classes is kept low by assuming small deviation from the original load coil deployment rules. However, this assumption is not always valid due to changes of the access network by reconfigurations, displacement of the Cos, introduction of transceiver-cabinets closer to the customer, and the like. Thus the topology of the loaded transmission line may be more irregular than dictated by the original load coil deployment rules. Thus, this methodology would require an impractically large number of line-classes to accurately predict the location of the load coils.

BRIEF SUMMARY OF THE INVENTION

A problem with prior art methods for load coil localization, therefore, is that they may be impractical or fail to provide accurate enough results in case of asymmetrically loaded transmission lines. A reliable and practical method for load coil localization is desirable since operators may be interested in removing the load coil(s) so that the transmission lines can support a DSL service. Without a reliable and practical load coil localization method, the removal of load coils may be a cumbersome and expensive operation.

Thus, an object of the present invention is to provide alternative methods and arrangements for load coil localization that allow for localization of load coils even if the transmission line is asymmetric.

A first embodiment of the present invention provides a method of localizing load coils within a multi-section transmission line between two endpoints. A section of the transmission line is either a load coil or a cable section of a specific cable type. The method includes performing a measurement of a Single-Ended Line Testing (SELT) parameter at one of the two endpoints, wherein the measurement provides a measurement of the characteristics of the transmission line at a number of frequencies; and generating a model of the multi-section transmission line, wherein the model is utilized to obtain an approximation of the measured SELT parameter. The model is based on a parameter vector θ including parameters describing the transmission properties of each section, and the length of a plurality of individual cable sections as unknown independent parameters. The method also includes determining the length of one or several cable sections to thereby localize one or several load coils within the multi-section transmission line. This length determination is performed by substantially minimizing a criterion function that represents a deviation between the measurement of the SELT parameter and the approximation of the SELT parameter obtained from the model.

A second embodiment of the present invention provides a load coil localization unit for localizing load coils within a multi-section transmission line between two endpoints. A section of the transmission line is either a load coil or a cable section of a specific cable type. The load coil localization unit includes an input unit for receiving a measurement of a SELT parameter at one of the two endpoints. This measurement provides a measurement of the characteristics of the transmission line at a number of frequencies. The load coil localization unit also includes a model generator for generating a model of the multi-section transmission line utilized to obtain an approximation of the measured SELT parameter. The model is based on a parameter vector θ including parameters describing the transmission properties of each section, and the length of a plurality of individual cable sections as unknown independent parameters. The load coil localization unit also includes a processing unit for determining the length of one or several cable sections to thereby localize one or several load coils within the multi-section transmission line. The processing unit performs this length determination by substantially minimizing a criterion function that represents a deviation between the measurement of the SELT parameter and the approximation of the SELT parameter obtained from the model.

An advantage of the present invention is that it can be implemented in existing telecommunications equipment without changing the hardware. Embodiments may be implemented in existing POTS and/or DSL transceivers without changing their hardware. An alternative is to implement the invention in a network management system that receives measurements on the transmission line from already existing transceivers. Thus implementation of the present invention may be achieved by a simple update of existing POTS and/or DSL networks.

Another advantage of the present invention is that it does not rely on an assumption of line symmetry for accurate performance. Thus, the present invention allows for accurate localization of load coils in case of asymmetric transmission lines as well as symmetric transmission lines. Many transmission lines that previously were symmetric are now asymmetric due to reconfigurations involving, for example, moving of a Central Office or removal of a load coil. Furthermore, the present invention is not restricted to a set of pre-determined and calibrated reference lines as in some prior art methods. Hence embodiments of the present invention are suited and robust for load coil localization of the transmission lines found in the copper access networks of today and provide an attractive alternative to manual in-field testing.

Further advantages and features of embodiments of the present invention will become apparent when reading the following detailed description in conjunction with the drawings.

BRIEF DESCRIPTION OF THE SEVERAL VIEWS OF THE DRAWING

In the following section, the invention will be described with reference to exemplary embodiments illustrated in the figures, in which.

DETAILED DESCRIPTION OF THE INVENTION

Figure 1:
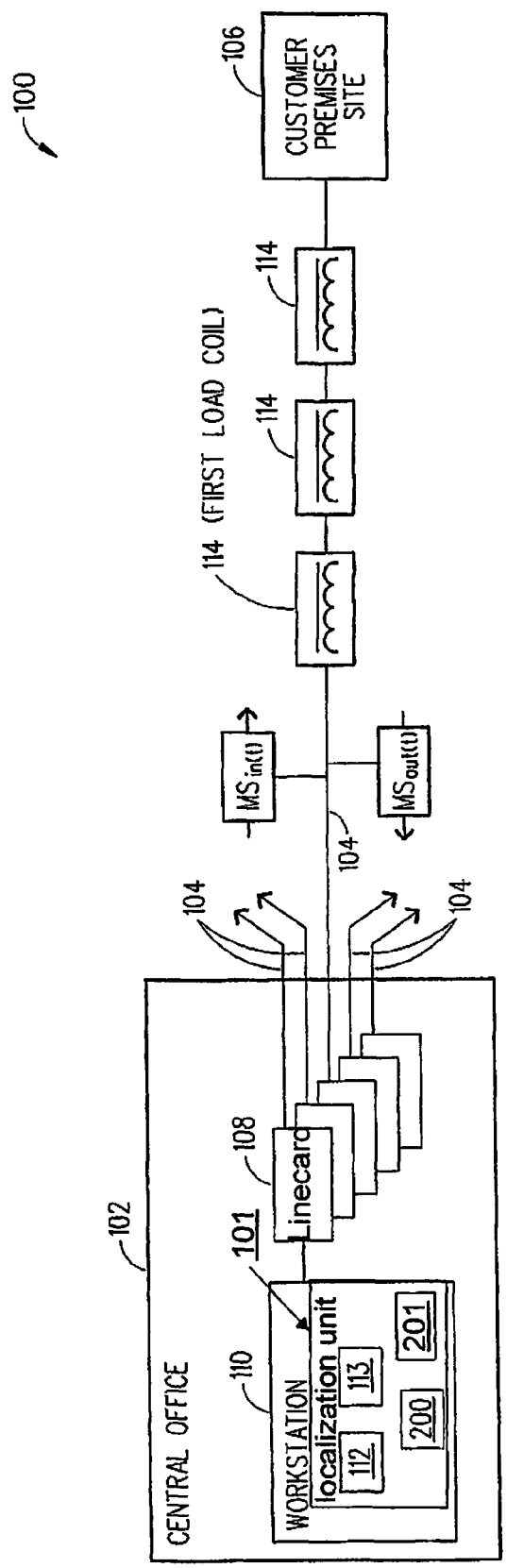
FIG. 1 is a schematic block diagram illustrating a telecommunications network provided with a load coil localization unit in accordance with an exemplary embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Referring to FIG. 1, there is shown a simplified block diagram of a telecommunications network 100 which is used to help explain a method 500 and a load coil localization unit 101 in accordance with exemplary embodiments of the present invention. The telecommunications network 100 has a central office (CO) 102 at which there is terminated one end of a series of transmission lines 104. The other end of the transmission lines 104 terminate at customer premises sites 106 (one shown). Inside, the central office 102 there is a series of line cards 108 each of which is connected to one end of the transmission lines 104. The CO 102 also has a workstation 110 (copper plant manager 110) which interfaces with the line cards 108 so it can conduct a Single-Ended Line Testing (SELT) measurement in accordance with the method 500. Single-ended line testing is performed by sending a measurement signal $MS_{in}(t)$ onto the transmission line 104 and receiving a return signal $MS_{out}(t)$ from which it is possible to determine measurements of a number of different SELT-parameters representing the characteristics of the transmission line 104.

The transmission lines 104 may be equipped with a number of load coils 114. The workstation 110 includes the load coil localization unit 101, which will be explained in greater detail below and which may be used to determine the location of one or several load coils 114 within a particular transmission line 104. The ability to locate the load coil(s) 114 is important because if there is a load coil 114 located within the transmission line 104 then that would disqualify the transmission line 104 from supporting a DSL service unless the load coil is removed. So, if an operator of the network 100 is able to find the load coil 114 then that load coil can be removed from the transmission line 104 so that it is able to support a DSL service. A detailed discussion about how the load coil 114 can be localized in accordance with exemplary embodiments is provided following a brief discussion about why load coil(s) 114 were installed on the transmission line 104 in the first place.

Historically, the load coils 114 were installed on the transmission lines 104 to reduce attenuation in the POTS band (but at the cost of increased attenuation at higher frequencies which are now used by the DSL services). The common practice was that transmission lines 104 longer than 18 kft (5.5 km) were equipped with load coils 114, whereupon the transmission lines were called loaded lines. The load coils 114 were typically placed on the transmission lines 104 at regular intervals of either 6 or 4.5 kft (1.8 or 1.4 km). These intervals were denoted by letters H and D, respectively. The first load coil 114 appeared about half of this distance from the CO 102 and the last load coil was typically placed about 3 kft (1 km) from the customer premises (CP) sites 106. However, the distance from the last load coil 114 to the customer premises 106 may be in some cases up to 10 kft. The load coils 114 were typically 88 or 66 mH inductors, but some were 44 mH inductors. The typical identification schemes were H88 and D66. The subscribers (and bridged taps) were typically never placed between two loading coils 114. However, because of loop reconfigurations, installations on new COs 102 and the like, there were left a number of shorter transmission lines 104 which had one or two load coils 114. Since the records of the copper plant changes are often inaccurate and/or insufficient, it cannot be ascertained which transmission lines 104 still contain load coils 114 or where they are located. As a result, there can be numerous transmission lines 104, which could qualify for DSL service only if the load coils 114 could be localized and removed. Therefore, it is essential to localize these load coils 114.

Figure 2:
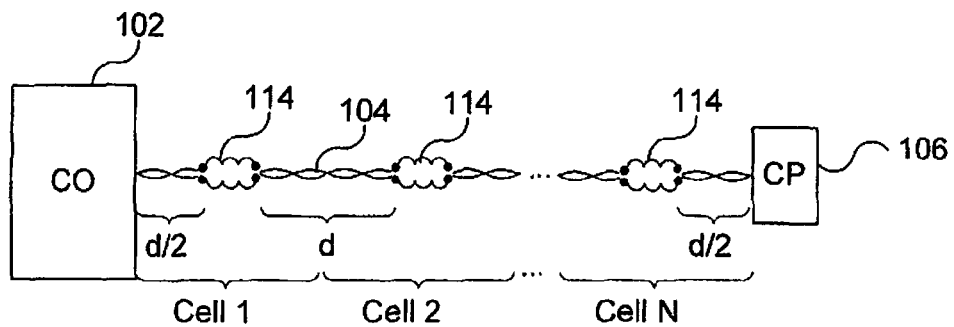
FIG. 2 is a schematic block diagram illustrating a symmetrically loaded transmission line.

FIG. 2 is a schematic illustration of a symmetrically loaded transmission line. Different methods for load coil localization can be used depending on whether the transmission line has a symmetric line topology or an asymmetric line topology. The distance d between two successive load coils 114 is equal, and the distance from the CO and from the customer premises site 106 to the nearest load coil is half the length between two successive load coils. Due to the symmetry, the transmission line 104 in FIG. 2 can be seen as a series of cascaded identical two-port cells where each cell consists of a load coil with two line-sections of length d/2 connected at each side.

Figure 4:
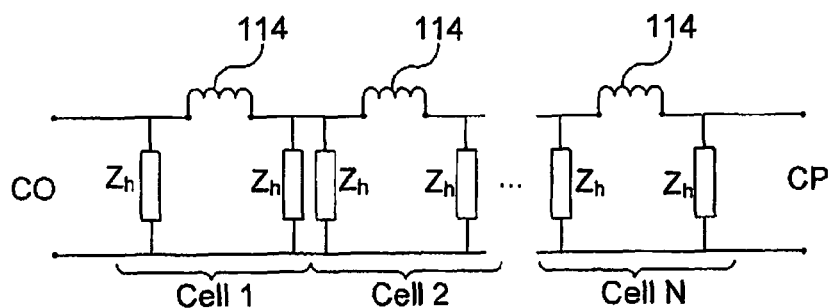
FIG. 4 is a schematic block diagram illustrating an approximation of a symmetrically loaded transmission line.

For the POTS band frequencies the input impedance of the symmetrically loaded line in FIG. 2 containing N load coils can be approximated by a continued fraction expansion (CFE). Subsequently, the symmetrically loaded line can be viewed as a series of repeated cells of impedances, as illustrated in FIG. 4. In FIG. 4, $Z_h$ denotes the first and last shunt impedance of each cell-circuit. The shunt impedance corresponds to the first and last line section of length d/2. Using the approximation of the symmetrically loaded transmission line of FIG. 4 a method for detecting and locating load coils 114 within the transmission line can be derived as explained in the above mentioned co-assigned PCT patent application WO 2007/072191.

Figure 3:
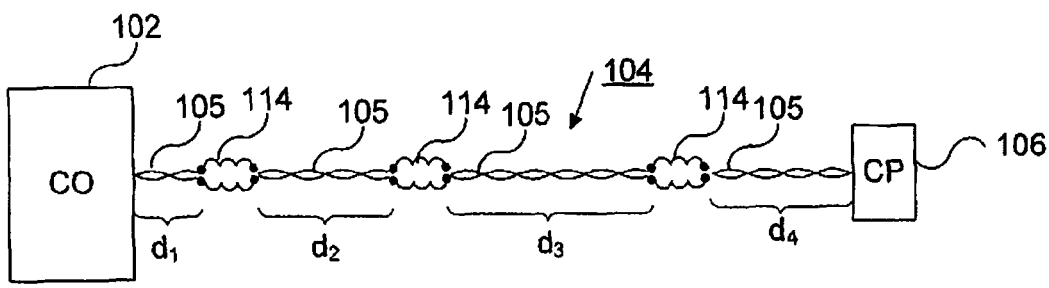
FIG. 3 is a schematic block diagram illustrating an asymmetrically loaded transmission line.

FIG. 3 is a schematic illustration of an asymmetrically loaded transmission line 104. However, if the loaded transmission line 104 is asymmetric, the method based on the approximation of FIG. 4 may not be able to provide an accurate enough load coil localization. For simplicity, three load coils 114 are illustrated in FIG. 3, but it is to be understood that the transmission line 104 can contain any number of load coils.

In FIG. 3 the distance between two successive load coils 114 may not be equal and the distance from the CO and from the customer premises site 106 to the nearest load coil may differ and may be independent of the distance between two successive load coils. Even though most transmission lines were symmetric or close to symmetric at some point in time, it is today common that transmission lines have become asymmetric due to reconfigurations made since the installation of the transmission line. It is for instance common that the CO 102 has been moved closer to the customer premises site 106. It is also possible that some but not all load coils within the transmission line has been removed which will have resulted in irregular intervals between successive load coils. Furthermore, the lack of symmetry of the transmission line may appear not only in terms various lengths of individual sections between the CO and the customer premises site 106. It is also likely that the transmission line includes different types of cable with different transmission characteristics, which also results in non-symmetry. There is therefore a need for a load coil localization method that is able to provide accurate results for asymmetric transmission lines. Such a method is provided according to an exemplary embodiment as will be explained in further detail below.

The load coil localization method according to an exemplary embodiment uses model-based optimization. The asymmetric transmission line 104 of FIG. 3 can be viewed as a multi-section transmission line comprising a number of load coils 114 and a number of cable sections 105 of lengths represented by independent length parameters $d_1, d_2, \ldots d_n$, where n is the number of cable sections of the transmission line. A cable section 105 is a continuous piece of cable of a specific cable type. Thus, if two successive load coils are connected by means of several interconnected pieces of cable of different cable types, then there will be several cable sections 105 between the two successive load coils. Bridged-taps are normally not found in loaded lines, and are therefore not considered herein, but can be handled in an analogous way.

The load coil localization method according to the exemplary embodiment generates a model of the multi-section transmission line for approximating a SELT parameter. The model is based on a parameter vector θ including parameters describing the transmission properties of each section, i.e., of each load coil and each cable section. Furthermore, the lengths of a plurality of individual cable sections $d_1, d_2, \ldots d_n$ are unknown independent parameters in the model. For the most accurate results, it is preferable that the length of each individual cable section is an independent parameter in the model, but depending on, for example, a-priori knowledge about the transmission line, it may be possible to use the same length parameter for a more than one cable section. For instance, if it is known that the distance between the CO, and between the customer premises site, and the nearest load coil is the same, then the same length parameter may be used to represent those distances. The method also performs a measurement of the same SELT parameter that the model approximates at one of the two endpoints of the transmission line (normally from the CO side) to obtain a measurement of the characteristics of the transmission line at a number of frequencies. Then a value for one or several of the length unknown parameters $d_1, d_2, \ldots d_n$ is/are determined by substantially minimizing a criterion function that represents a deviation between the measurement of the SELT parameter and the approximation of the SELT parameter obtained from the model.

This method is more complex than the method disclosed in the above mentioned co-assigned PCT patent application WO 2007/072191, but is more general and able to provide accurate load coil localization for both asymmetrically and symmetrically loaded transmission lines. There are however several ways of reducing the complexity of the method as will become apparent from the detailed description of an example of a preferred embodiment of the present invention.

According to this exemplary embodiment, the measure SELT parameter is a line input impedance $Z_{in}(f)$ of the transmission line (f denotes frequency) and the model will in this case be a model $Z_{model}(f,\theta)$ of the line input impedance. The model $Z_{model}(f,\theta)$ depends on a parameter vector $\theta$, with parameters that represent transmission line properties such as the number of line sections, the lengths of cable sections and the cable types. The lengths of the cable sections are determined by minimizing a criterion function $J(\theta)$ that represents the deviation between the measured line input impedance $Z_{in}(f)$ and the model $Z_{model}(f,\theta)$. This criterion function can be expressed as:

$$J(\theta) = \sum_{f=flow}^{fhigh} |Z_m(f) - Z_{model}(f, \theta)|^p \qquad (1)$$

where fhigh is the highest frequency considered; flow is the lowest frequency considered; and p is an integer greater than zero, i.e. p=1, 2, 3, . . . . For the special case where p=2 the criterion function $J(\theta)$ corresponds to the sum of least-squares, often referred to as the least-squares (LS) error. It will naturally be possible to obtain a more accurate result if many frequencies are considered. The parameter vector $\theta$ that minimizes the value of $J(\theta)$ is denoted:

$$\theta_{LS} = \arg\min_{\theta} J(\theta) \qquad (2)$$

and the values for the cable section length parameters $d_1, d_2, \ldots d_n$ of $\theta_{LS}$ are chosen as estimates for the cable section lengths. Estimating the lengths of the cable sections 105 means also that the locations of the load coils 114 are estimated.

For the model $Z_{model}(f,\theta)$ the two-port theory is used. The multi-section transmission line 104 is represented by cascaded two-port networks. A section, i.e. a load coil 114 or a cable section 105 is modeled by a frequency-dependent chain matrix (also referred to as ABCD-matrix or transmission matrix). A section s is represented by a chain matrix:

$$M^s = \begin{bmatrix} A & B \\ C & D \end{bmatrix} \qquad (3)$$

For a cable section this matrix is modeled by a matrix:

$$M^{cable} = \begin{bmatrix} \cosh(\gamma d_s) & Z_0 \sinh(\gamma d_s) \\ \dfrac{\sinh(\gamma d_s)}{Z_0} & \cosh(\gamma d_s) \end{bmatrix}, \qquad (4)$$

while a load coil is modeled by a matrix:

$$M^{loadcoil} = \begin{bmatrix} 1 & j2\pi f L_C \\ 0 & 1 \end{bmatrix}. \qquad (5)$$

In equation EQ. 4, $d_s$ denotes the length of the section s; $\gamma$ is propagation constant; and $Z_0$ is characteristic impedance. In equation EQ. 5, $L_C$ is load coil inductance and $2\pi f$ is angular frequency in units rad/s. Note that the frequency dependence of $\gamma$ and $Z_0$ is omitted for simplicity. The complexity of the minimization problem may be reduced by inserting numerical values for $\gamma$ and $Z_0$ using for example a cable database as will be discussed further below.

The total transmission matrix M for the multi-section transmission line 104 is given by:

$$M = M^1 \times M^2 \ldots \times M^{ns}, \qquad (6)$$

where ns is the number of sections of the multi-section transmission line, and where a section s is represented by a transmission matrix $M^s$. The input impedance of the modeled transmission line, associated with the parameter vector $\theta$, can be expressed as:

$$Z_{model}(f, \theta) = \frac{A(f, \theta) Z_T(f) + B(f, \theta)}{C(f, \theta) Z_T(f) + D(f, \theta)} \qquad (7)$$

where A, B, C, and D are the chain matrix elements of matrix M in EQ. 6. These four elements depend, as explicitly stated, on the frequency f and on the parameter vector $\theta$. In EQ. 7, $Z_T(f)$ denotes far-end termination impedance of the multi-section transmission line. In many cases it can be assumed that the termination is an on-hook POTS phone with approximately infinite impedance, leading to a simplified model for the line input impedance derived from EQ. 7, i.e.

$$Z_{model}(f, \theta) = \frac{A(f, \theta)}{C(f, \theta)} \qquad (8)$$

Having defined a model for $Z_{in}(f)$ by EQ. 8, we now return to the minimization in EQ. 2.

Given a loaded transmission line with ns number of sections, it follows from EQ. 3 through EQ. 6 that substitution of EQ. 8 in EQ. 1 leads to a non-linear LS minimization problem in equation EQ. 2, since the model in equation EQ. 8 is not linear in the unknown parameters of $\theta$. This problem may be solved, for example, utilizing stochastic optimization according to a method that is known to the person skilled in the art. However the minimization poses a challenge due to the multi-dimensional criterion function with multiple local optima. The success of the solution of this problem depends on several factors such as the choice of optimization algorithm, the number of unknown parameters (dimension), boundary constraints, and the amount of available a priori information. A number of strategies that may be used to lower the complexity of the problem according to different exemplary embodiments will be explained below.

As mentioned above a load coil detection method and a load coil localization method particularly suitable for symmetrically loaded transmission lines is disclosed in WO 2007/072191. This load coil detection method is based on measuring the line input impedance of the transmission line and determining whether there are peaks in the impedance function. A peak in the impedance function indicates the presence of a load coil. Thus, the number of present load coils is determined by counting the number of peaks. For a symmetric transmission line it is then possible to determine the location of the load coil(s), and thus the length of the cable sections, from the highest measured resonant frequency as explained in WO 2007/072191 (this load coil localization method is hereinafter referred to as a load coil localization method for symmetric lines). However, there will be a frequency-shift of the resonant peak(s) of the impedance function for an asymmetric transmission line relative to a symmetric transmission line which means that the load coil localization method for symmetric lines decreases in accuracy if the transmission line is asymmetric.

Figure 6:
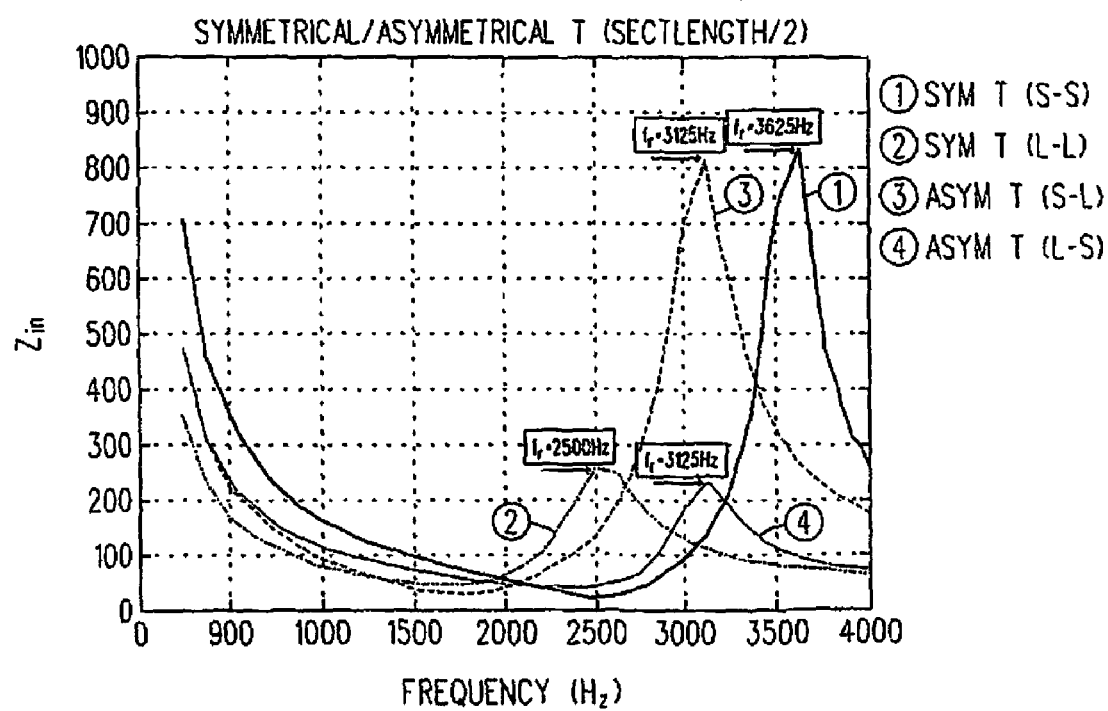
FIG. 6 is a graph illustrating a comparison of input impedance peaks of symmetric transmission lines and asymmetric transmission lines.

The frequency-shift of resonant peaks is illustrated in FIG. 6, which is a plot showing input impedances $Z_{in}$ of asymmetrically loaded transmission lines (see lines 3 and 4, where S-L denotes that a load coil is preceded by a short cable section and followed by a long cable section, while L-S denotes the opposite relationship of cable section lengths) compared to the input impedances for $Z_{in}$ of symmetrically loaded transmission lines (see lines 1 and 2). The peaks of $Z_{in}$ are shifted towards lower frequencies when the cable length of a section increases or some additional cable is connected to the transmission line 104. But a symmetrically and an asymmetrically loaded transmission cable with the same number of load coils present will have the same number of peaks in the impedance function even if these peaks are located at different frequencies. Therefore the load coil detection method, in which it is determined that the number of load coils present is equal to the number of peaks in the impedance function, can be used to lower the complexity of the minimization problem above according to an embodiment of the present invention.

By first detecting the number of load coils using, for example, the load coil detection method discussed above (or another load coil detection method according to prior art) the structure of the line topology of the multi-section transmission line 104 is known prior to the minimization in EQ. 2. It thus remains to estimate the lengths of the cable sections 105 and the parameters that are related to the transmission characteristics of the cable sections that depend on cable type. However, the number of unknown parameters may be further reduced to one integer-value per cable type and one length-parameter per cable section if estimates or known values from a cable data base are used. The cable database may list numeric estimates or known values that represent the transmission properties of different cable types. It is also possible to use a cable database that specify cable models with inherent electromagnetic and geometric parameters that characterize cable insulation material, resistivity, wire diameter and the like of different cable types, but then the complexity will be higher than the case when each cable type is represented by a single numeric value. If it is known a priori that there is a single cable-type line (i.e. only one type of cable) between two successive load coils and the inductance of the load coils is known to be for example 88 mH or 66 mH, then there are 2(N+1) parameters in the parameter vector θ to be optimized for N number of load coils.

In the above described exemplary embodiment, the SELT parameter that was measured and modeled was the input impedance $Z_{in}(f)$. However it is also possible to measure and model another type of SELT-parameter according to alternative embodiments. An example of another type of SELT-parameter that may be used is a one-port scattering parameter, referred to as $S_{11}$. Load coil localization could then be achieved by substantially minimizing the deviation between a measurement of $S_{11}$ and an approximation of $S_{11}$ obtained from a model.

Figure 5:
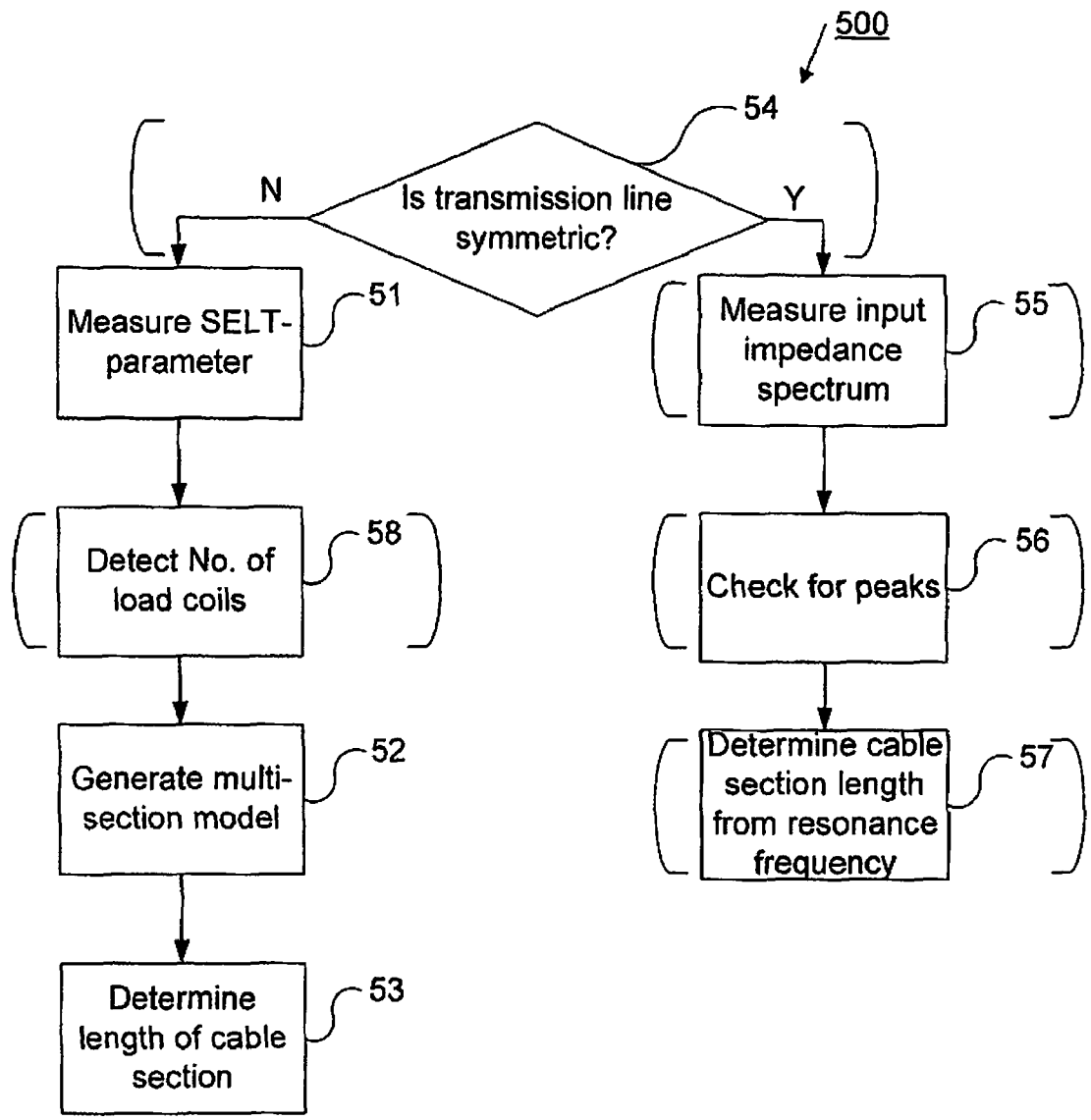
FIG. 5 is a flowchart illustrating an embodiment of a method according to the present invention.

A flow diagram of an exemplary embodiment of the load coil localization method 500 according to the present invention is illustrated in FIG. 5. The method 500 includes a step 51 in which a chosen SELT-parameter is measured. In a step 52, a model of the multi-section transmission line 104 is generated. The model is generated such that an approximation of the SELT-parameter that was measured in step 51 can be obtained from the model. Furthermore, the model is based on the parameter vector θ including parameters that describe the transmission properties of each cable section. The lengths of a plurality of individual cable sections are also unknown independent parameters in the model. The length of one or several cable sections are then determined in a step 53, which also means that one or several load coils are localized. This determination of cable section length(s) is performed by substantially minimizing a criterion function that represents a deviation between the measurement of the SELT-parameter and the approximation of the SELT-parameter obtained from the model generated in step 52.

As explained above, it is optional in the method 500 to substitute at least some of the parameters in the vector θ with known values or a limited number of possible numeric estimates in order to simplify the determination of cable section lengths in step 53 by reducing the number of unknown parameters.

Although it is shown in FIG. 5 that step 51 is performed prior to step 52, it is possible to change the order of these two steps.

As mentioned above, an optional step 58 in which the number of load coils within the transmission line is detected may also be performed prior to generating the model of the multi-section transmission line 104. There are a number of different load coil detection methods according to prior art. By first detecting the number of load coils using one of those methods it is possible to use this knowledge when generating the model in step 52. Thus the number of unknown parameters in the model may be reduced and the problem that needs to be solved in step 53 becomes simpler.

The method provided by steps 51-53 (and optional step 58) is general and can be used for load coil localization within both symmetric and asymmetric transmission lines. However, since this method is more complex than the above mentioned load coil localization method for symmetric lines, it would be beneficial to use the more complex method for asymmetric transmission lines and the less complex method for symmetric transmission lines. Therefore, as an option, the method 500 may include an initial step 54 in which it is determined whether the multi-section transmission line is symmetric. If it is found in step 54 that the transmission line is symmetric, the load coil localization may be performed in accordance with the load coil localization method for symmetric lines. This implies that the input impedance spectrum of the transmission line would be measured, optional step 55, and that impedance function is examined to check for peaks, optional step 56. The length of a cable section can then be determined form the highest resonance frequency as disclosed in WO 2007/072191, optional step 57. If it is found in step 54 that the transmission line is asymmetric, the load coil localization may be performed according to steps 51-53 (and possibly also step 58) as explained above.

One way of determining whether a transmission line is symmetric or asymmetric in step 54 is to compare an estimation of the total line length obtained by means of the load coil localization method for symmetric lines with an independent estimate of the total line length, which is not based on an assumption of line symmetry. In case the two estimates differ significantly, it is likely that the transmission line is asymmetric and that the load coil localization method according to steps 51-54 should be used. The limits for when the two estimates are considered to differ significantly or are considered to be substantially equal is an implementation choice and depends on the desired accuracy in the load coil localization. It is for instance possible determine that the transmission line is symmetric if an absolute difference between the two estimates is below a predetermined threshold value $\epsilon$. The threshold value $\epsilon$ may be chosen, for example, to be 100 meters, but other values are also possible depending on the desired accuracy of the load coil localization. Another example is that the transmission line is considered to be symmetric if the two estimates differ by less than, for example, 10% or 20%.

An estimate of the total line length $\hat{d}_{totSYM}$ is obtained from the load coil localization method for symmetric lines by multiplying the number of detected load coils $\hat{N}$ with the distance $\hat{d}$ between two neighboring load coils as determined by the load coil localization method for symmetric lines, i.e.

$$\hat{d}_{totSYM} = \hat{N}\hat{d} \qquad (9)$$

An independent estimate $\hat{d}_{tot}$ of the total line length may be obtained if the measured line input impedance is approximated with a capacitance, i.e.

$$Z_{in}(f) \approx \frac{1}{j2\pi f C_{km} d_{tot}}. \qquad (10)$$

The approximation in equation EQ. 10 is only valid for low frequencies. It thus follows from equation EQ. 10 that the total line length can be estimated by:

$$\hat{d}_{tot} = \frac{-1}{\Im\{Z_{in}(f_{low})2\pi f_{low} C_{km}\}}, \qquad (11)$$

where $f_{low}$ is the lowest available measured frequency in Hz and $\Im\{\cdot\}$ denotes the imaginary part. Thus it would be determined in step 54 that the transmission line under text is symmetric if $\hat{d}_{totSYM} \approx \hat{d}_{tot}$.

It can be noted that if step 54 is performed by determining if $\hat{d}_{totSYM} \approx \hat{d}_{tot}$ then this would imply that steps 55-57 in FIG. 5 actually would have been performed prior to step 54 in order to determine $\hat{d}_{totSYM}$. Thus, if it is decided in step 54 that the transmission line is to be considered as symmetric, then there is no need to repeat steps 55-57. Step 54 would then serve as a confirmation that the previously made cable section length determination is valid for load coil localization.

The cable section length determination that is performed in step 53 is made by means of substantially minimizing the criterion function that represents the deviation between the measured SELT parameter and the approximation of the SELT parameter obtained from the model as mentioned above. This may involve setting up an optimization criterion such as EQ. 2 according to the above described embodiment and possibly also boundary constraints and substitution of possible parameter values depending on the amount of available a priori information regarding the transmission line under test. To provide a specific example of an embodiment, the minimization may be performed using stochastic optimization with Gaussian adaptation. A cable database may consist of, for example, ETSI 0.4 mm, ETSI 0.5 mm, and ETSI 0.63 mm, which defines the set of $\gamma$ and $Z_0$ in EQ. 8. Optional step 58 may be performed to determine the number of load coils in the model. Optimization constraints may be applied that define acceptable length intervals for the first and the last cable sections, as well as inter-load coil spacing, e.g. 0.3-3.0 km for the first cable section, 0.3-3.5 km for the last cable section and 1.5-3.8 km for intermediate cable sections.

Accordingly, there are many different techniques available for solving this optimization problem, both numeric and analytical depending on the dimension of the problem. The present invention is however not limited to any specific type of technique for solving this optimization problem. Furthermore, depending on the desired accuracy of the load coil localization it is not necessary to find exactly the optimal solution, i.e. the solution that minimizes the deviation between the measurement of the SELT-parameter and the approximation from the model. It may be considered sufficient to find a near optimal solution that e.g. determines the section lengths within a relative error of 10% or within 100 meters from the true length.

The method according to the present invention may be performed using a load coil localization unit 101. The load coil localization unit could for instance be integrated in a CO workstation 110 as shown in FIG. 1, but integration in other network equipment or implementation as a separate unit is also feasible. It is possible to implement the load coil localization unit using already existing hardware in telecommunications networks and to utilize already installed transceivers for one-port measurements. It is for instance possible to integrate the load coil localization unit in existing POTS and/or DSL transceivers without changing their hardware. An alternative is to integrate the load coil localization unit with a network management system that receives measurements on the transmission line from already existing transceivers. Thus, implementation of the load coil localization unit according to the present invention may involve provisioning of new software only, although implementations requiring new hardware, firmware or combinations thereof are also feasible as will be understood by the person skilled in the art from this description.

The example load coil localization unit 101 in FIG. 1 comprises an input unit 112 which is adapted to receive the measurement of the SELT parameter. A model generator 113 is adapted to generate the model by which the approximation of the measured SELT parameter can be obtained. The load coil localization unit 101 also includes a processing unit 200 that is adapted to perform the cable section length determination according to step 53. The load coil localization unit may optionally also include a load coil detector unit 201 adapted to perform load coil detection in accordance with step 58.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of localizing load coils within a multi-section transmission line between two endpoints, wherein a section of the transmission line is defined as a load coil or a cable section of a specific cable type, the method comprising the steps of:

performing a measurement of a Single-Ended Line Testing (SELT) parameter at one of the two endpoints, wherein the measurement provides a measurement of characteristics of the transmission line at a number of frequencies;

generating a model of the multi-section transmission line based on a parameter vector θ including parameters describing transmission properties of each section and a length of a plurality of individual cable sections as unknown independent parameters;

determining from the model, an approximation of the measured SELT parameter; and determining a length of at least one cable section to thereby localize at least one load coil within the multi-section transmission line by minimizing a criterion function that represents a deviation between the measurement of the SELT parameter and the approximation of the SELT parameter determined from the model.

2. The method according to claim 1, wherein the substantial minimization of the criterion function is derived with respect to a plurality of the number of frequencies.

3. The method according to claim 1, further comprising:

detecting the number of load coils within the multi-section transmission line utilizing a load coil detection method; and inserting the number of detected load coils in the model to reduce the number of unknown parameters in the model.

4. The method according to claim 3, wherein the load coil detection method includes performing a measurement of a line input impedance spectrum of the multi-section transmission line at one of the two endpoints;

determining a number of amplitude peaks of the measured line input impedance spectrum; and setting the number of detected load coils to equal the number of determined amplitude peaks.

5. The method according to claim 1, further comprising reducing the number of unknown parameters in the model, wherein a number of possible numeric estimates or known values of the parameter vector θ, or a subset of the parameter vector θ, is derived from a cable database listing estimates or known values representing the transmission properties of specific cable types.

6. The method according to claim 1, wherein the measured SELT parameter is a one-port scattering parameter $S_{11}$.

7. The method according to claim 1, wherein the measured SELT parameter is a line input impedance.

8. The method according to claim 7, wherein the model is based on an approximation that a far end termination impedance of the multi-section transmission line is a frequency-dependent parameter $Z_T(f)$.

9. The method according to claim 7, wherein the model is a model of the line input impedance and is given by:

$$Z_{model}(f, \theta) = \frac{A(f, \theta)Z_T(f) + B(f, \theta)}{C(f, \theta)Z_T(f) + D(f, \theta)},$$

where θ is the parameter vector, f denotes frequency and A, B, C and D are chain matrix elements of a matrix $$M = M^1 \times M^2 \ldots \times M^{ns} = \begin{bmatrix} A & B \\ C & D \end{bmatrix},$$

where ns is the number of sections of the multi-section transmission line, and where a section s is represented by a transmission matrix $M^s$.

10. The method according to claim 7, wherein the model is based on an approximation that a far end termination impedance of the multi-section transmission line is infinite.

11. The method according to claim 10, wherein the model is a model of the line input impedance and is given by:

$$Z_{model}(f, \theta) = \frac{A(f, \theta)}{C(f, \theta)},$$

where θ is the parameter vector, f denotes frequency, and A and C are chain matrix elements of a matrix $$M = M^1 \times M^2 \ldots \times M^{ns} = \begin{bmatrix} A & B \\ C & D \end{bmatrix},$$

where ns is the number of sections of the multi-section transmission line and where a section s is represented by a transmission matrix $M^s$.

12. The method according to claim 1, further comprising:

initially determining whether the multi-section transmission line is substantially symmetric; and when the multi-section transmission line is determined to be substantially symmetric, determining the length of at least one cable section utilizing a load coil localization method for symmetric lines.

13. The method according to claim 12, wherein the step of initially determining whether the multi-section transmission line is substantially symmetric includes:

computing a first estimate $\hat{d}_{totSYM}$ of the total line length of the multi-section transmission line utilizing a load coil localization method for symmetric lines;

deriving a second estimate $\hat{d}_{tot}$, independent of the first estimate, of the total line length of the multi-section transmission line;

comparing the first and second line-length estimates; and determining that the multi-section transmission line is substantially symmetric if an absolute difference between the first and second line-length estimates is below a predetermined threshold value ε.

14. A load coil localization unit for localizing load coils within a multi-section transmission line between two endpoints, wherein a section of the transmission line is defined as a load coil or a cable section of a specific cable type, the load coil localization unit comprising:

an input unit for receiving a measurement of a Single-Ended Line Testing (SELT) parameter at one of the two endpoints, wherein the measurement provides a measurement of characteristics of the transmission line at a number of frequencies;

a model generator for generating a model of the multi-section transmission line based on a parameter vector θ including parameters describing the transmission properties of each section and a length of a plurality of individual cable sections as unknown independent parameters; and a processing unit for determining from the model, an approximation of the measured SELT parameter, and for determining a length of at least one cable section to thereby localize at least one load coil within the multi-section transmission line by minimizing a criterion function that represents a deviation between the measurement of the SELT parameter and the approximation of the SELT parameter determined from the model.

15. The load coil localization unit according to claim 14, wherein the substantial minimization of the criterion function is derived with respect to a plurality of the number of frequencies.

16. The load coil localization unit according to claim 14, further comprising a load coil detector unit for detecting the number of load coils within the multi-section transmission line utilizing a load coil detection method;
wherein the model generator inserts the number of detected load coils in the model to reduce the number of unknown parameters in the model.

17. The load coil localization unit according to claim 16, wherein the load coil detection unit includes:
an input unit for receiving a measurement of the line input impedance spectrum of the multi-section transmission line at one of the two endpoints, and
a processing unit for determining a number of amplitude peaks of a measured line input impedance spectrum, and to set the number of detected load coils to equal the number of determined amplitude peaks.

18. The load coil localization unit according to claim 14, wherein the model generator includes means for reducing the number of unknown parameters in the model, wherein a number of possible numeric estimates or known values of the parameter vector $\theta$, or a subset of the parameter vector $\theta$, is derived from a cable database listing estimates or known values representing the transmission properties of specific cable types.

19. The load coil localization unit according to claim 14, wherein the measured SELT parameter is a one-port scattering parameter $S_{11}$.

20. The load coil localization unit according to claim 14, wherein the measured SELT parameter is a line input impedance.

21. The load coil localization unit according to claim 20, wherein the model is based on an approximation that a far end termination impedance of the multi-section transmission line is a frequency-dependent parameter $Z_T(f)$.

22. The load coil localization unit according to claim 21, wherein the model is a model of the line input impedance and is given by:

$$Z_{model}(f, \theta) = \frac{A(f, \theta)Z_T(f) + B(f, \theta)}{C(f, \theta)Z_T(f) + D(f, \theta)},$$

where $\theta$ is the parameter vector; f denotes frequency; and A, B, C, and D are chain matrix elements of a matrix $$M = M^1 \times M^2 \ldots \times M^{ns} = \begin{bmatrix} A & B \\ C & D \end{bmatrix},$$

where ns is the number of sections of the multi-section transmission line, and where a section s is represented by a transmission matrix $M^s$.

23. The load coil localization unit according to claim 20, wherein the model is based on an approximation that a far end termination impedance of the multi-section transmission line is infinite.

24. The load coil localization unit according to claim 23, wherein the model is a model of the line input impedance and is given by:

$$Z_{model}(f, \theta) = \frac{A(f, \theta)}{C(f, \theta)},$$

where $\theta$ is the parameter vector; f denotes frequency; and A and C are chain matrix elements of a matrix $$M = M^1 \times M^2 \ldots \times M^{ns} = \begin{bmatrix} A & B \\ C & D \end{bmatrix},$$

where ns is the number of sections of the multi-section transmission line, and where a section s is represented by a transmission matrix $M^s$.

25. The load coil localization unit according to claim 14, wherein the processing unit also includes:
means for determining whether the multi-section transmission line is substantially symmetric; and
means for determining the length of at least one cable section utilizing a load coil localization method for symmetric lines, responsive to a determination that the multi-section transmission line is substantially symmetric.

26. The load coil localization unit according to claim 25, wherein the processing unit determines whether the multi-section transmission line is substantially symmetric by:
computing a first estimate $\hat{d}_{totSYM}$ of a total line length of the multi-section transmission line utilizing a load coil localization method for symmetric lines;
deriving a second estimate $\hat{d}_{tot}$, independent of the first estimate, of the total line length of the multi-section transmission line;
comparing the first and second line-length estimates; and
determining that the multi-section transmission line is substantially symmetric when an absolute difference between the first and second line-length estimates is below a predetermined threshold value $\epsilon$.

* * * * *

UNITED STATES PATENT AND TRADEMARK OFFICE
CERTIFICATE OF CORRECTION

| | | |
|---|---|---|
| PATENT NO. | : 7,844,436 B2 | Page 1 of 1 |
| APPLICATION NO. | : 12/478908 | |
| DATED | : November 30, 2010 | |
| INVENTOR(S) | : Lindqvist et al. | |

It is certified that error appears in the above-identified patent and that said Letters Patent is hereby corrected as shown below:

In Column 7, Line 29, delete "thigh" and insert -- fhigh --, therefor.

Signed and Sealed this
Eighth Day of November, 2011

David J. Kappos
*Director of the United States Patent and Trademark Office*